United States Patent [19]
Persson

[11] Patent Number: 6,039,529
[45] Date of Patent: Mar. 21, 2000

[54] VACUUM LIFTING PLATE WITH SUCTION PASSAGEWAY BALL VALVES

[75] Inventor: Curt Persson, Torsby, Sweden

[73] Assignee: Tepro Machine & Pac-System Aktiebolag, Torsby, Sweden

[21] Appl. No.: 09/180,868

[22] Filed: Nov. 24, 1998

[30] Foreign Application Priority Data

May 24, 1996 [SE] Sweden .................................. 9601976

[51] Int. Cl.⁷ ...................................................... B66C 1/02
[52] U.S. Cl. ........................ 414/627; 414/416; 414/662; 294/64.1
[58] Field of Search ..................... 414/627, 416, 414/662; 294/64.1, 65

[56] References Cited

U.S. PATENT DOCUMENTS

| 715,905 | 12/1902 | Tuck et al. |
|---|---|---|
| 2,903,290 | 9/1959 | Morris et al. ..................... 414/416 X |
| 3,207,325 | 9/1965 | Whallon et al. .................... 294/64.1 X |
| 3,754,751 | 8/1973 | Capetti et al. ..................... 294/64.1 X |
| 4,692,575 | 9/1987 | Eberle ........................................ 200/82 |
| 5,024,574 | 6/1991 | Wilson et al. ........................... 414/416 |
| 5,409,347 | 4/1995 | Suzuki .................................. 294/65 X |

FOREIGN PATENT DOCUMENTS

| 19 26 479 | 12/1970 | Germany ................................. 294/65 |
| 2 146 705 | 3/1973 | Germany ......................... B66C 1/02 |
| 30 18 082 | 11/1981 | Germany ................................. 294/65 |

*Primary Examiner*—Robert P. Olszewski
*Assistant Examiner*—Gerald J. O'Connor
*Attorney, Agent, or Firm*—George T. Marcou; Kilpatrick Stockton LLP

[57] ABSTRACT

An apparatus for lifting and moving articles, comprising at least one arrangement with a vacuum chamber, which is connected to an arrangement which is capable of producing negative pressure in the vacuum chamber, the underside of a lower plate being provided with an elastic airtight bottom and also being provided with a number of first through-passages to the vacuum chamber.

13 Claims, 3 Drawing Sheets

VACUUM LIFTING PLATE WITH SUCTION PASSAGEWAY BALL VALVES

BACKGROUND OF THE INVENTION

In handling equipment for lifting and moving articles, use has long been made of negative pressure as a gripping function. The basic problem with negative pressure is that the lifting arrangement must close tightly against the article in order to obtain a lifting effect and that air must not be allowed to be sucked into the system anywhere else as otherwise the lifting capacity is lost. For lifting individual articles, this is not a major problem if the lifting arrangement can be designed so that it encloses the article. The problem is major, on the other hand, if a lifting arrangement and a negative-pressure source are to be used to lift many articles at the same time. A number of arrangements are known, which take the form of a lifting plate with a vacuum chamber comprising a number of passages out to the surface against which the articles to be lifted bear. Some of these plates have some form of blocking arrangement for the individual passages so, in order that negative pressure is not lost, the passages and the articles must be orientated in relation to one another so that all passages are covered so that a proper lifting negative pressure can be established. This involves laborious arrangement of the articles and also special adaptation of the lifting plates to the specific articles to be lifted.

A further disadvantage is that if an article comes loose during the lift, then the negative pressure and all the articles are lost. Certain plates have blocking arrangements for each passage, either in the form of mechanical valves or light balls which are sucked firmly against a seat and block the passage if it is not covered by an article. Known vacuum plates therefore have a relatively complicated design and construction and/or handling in order for the blocking arrangements to function correctly and have thus far not been really effective for lifting and handling many articles at the same time, and for lifting and handling many different types of articles with the same device.

SUMMARY OF THE INVENTION

The object of the present invention is to provide an effective lifting arrangement based on negative pressure and also a simple and cost-effective construction. This object is achieved according to one aspect of the invention by an apparatus being characterized in that each first passage is of cylindrical design with a diameter reduction in the part which is connected to the vacuum chamber, forming a shoulder in the passage, in that the passage contains a body arranged movably in said passage, in that said body, in planes which are at right angles to the center line of the passage, has a greater diameter which is only slightly smaller than the diameter of said first passage, and in that said first passage is provided with a second passage with a considerably smaller diameter than the first passage, said body being capable of essentially blocking said first passage when a negative pressure is obtained in the vacuum chamber with the exception of a given air flow in said second passage.

According to another aspect of the invention, a lifting arrangement comprising said apparatus is provided, characterized in that it comprises arrangements capable of moving the arrangement vertically and horizontally and also towards the articles to be lifted, with the underside of the vacuum plate parallel to the plane which is formed by the surfaces of the articles facing the plate, and also members which, on contact with the articles to be lifted, are capable of angling the plate in relation to said plane.

Further aspects and advantages of the invention will emerge from the detailed description of a possible embodiment and also from the subsequent patent claims.

BRIEF DESCRIPTION OF THE FIGURES

In the following description of a preferred embodiment, reference will be made to the attached drawings, in which.

DESCRIPTION OF PREFERRED EMBODIMENT

Figure 1:
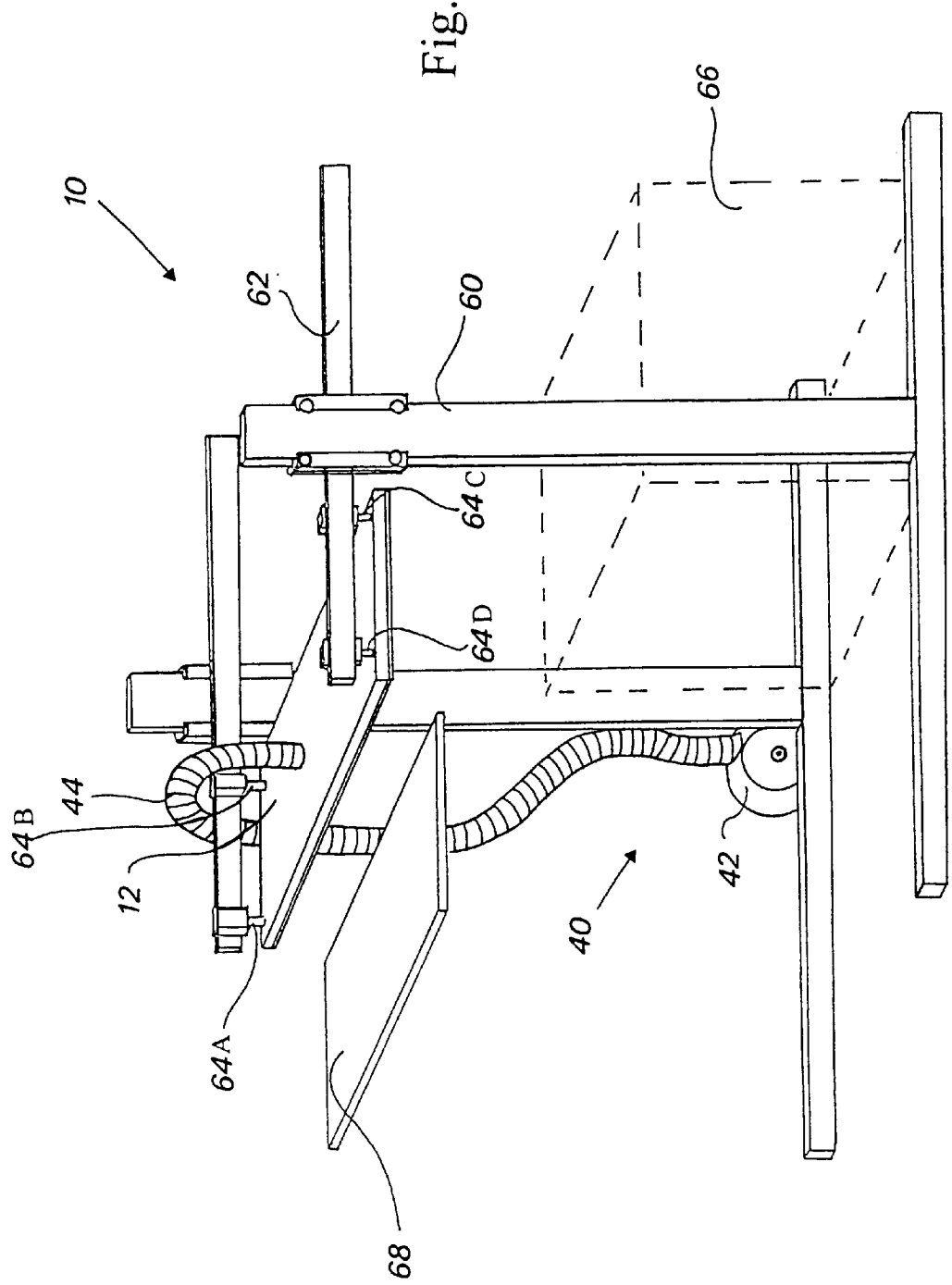
FIG. 1 shows a perspective view of an embodiment of the lifting arrangement according to the invention.
Figure 2:
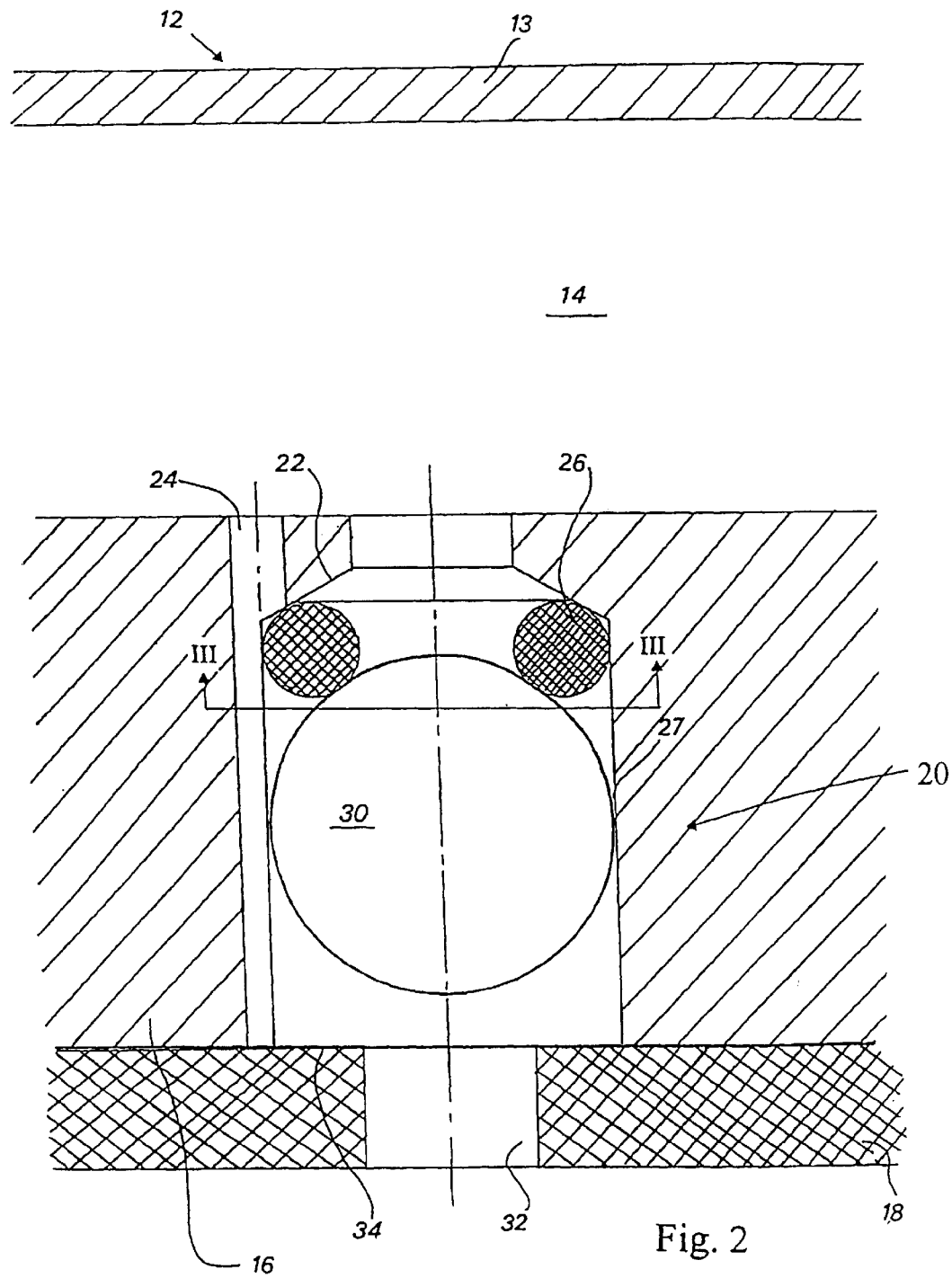
FIG. 2 shows a detailed, partial, cutaway view in cross-section of a vacuum plate forming part of the lifting arrangement according to FIG. 1.
Figure 3:
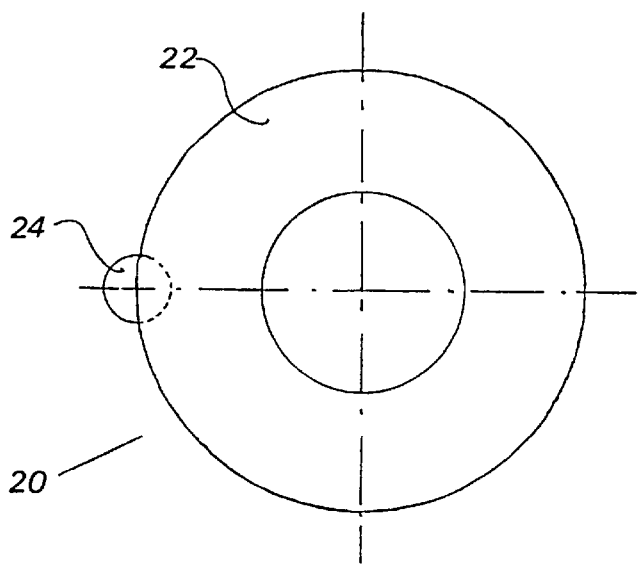
FIG. 3 shows a detailed view from below of a passage formed in the vacuum plate.

The arrangement according to the invention which is shown in FIG. 1 has the general reference number 10 and comprises a vacuum lifting body, here called the vacuum plate 12. The vacuum plate comprises a space, hereafter called the vacuum chamber 14, FIG. 2, which is enclosed by an upper plate 13, sides (not shown) and an essentially plane lower plate 16, hereafter called the valve plate. Mounted on the underside of the valve plate 16 is a plate 18 made of elastic airtight material, for example cellular rubber. A number of through-passages 20 are arranged in the valve plate 16. Each passage 20 is designed as a cylindrical hole with a considerable reduction in diameter close to the inlet to the vacuum chamber so that a shoulder 22 is formed. At the edge of the passage 20, a hole 24, hereafter called escape air hole, is arranged and extends parallel to the through-hole. As is shown in FIG. 3, the escape air hole 24 is orientated in such a manner that its center line coincides with the cylindrical surface of the passage.

The escape air hole 24 has a considerably smaller diameter than the passage. More specifically, the diameter of the escape air hole 24 is less than 0.2 times the diameter of the passage 20 above shoulder 22 which means that the ratio between the cross-sectional areas of the escape air hole 24 and of the passage 20 above shoulder 22 is less than 0.04. An elastic ring 26, for example an O-ring, is pressed into the passage and bears against the shoulder 22. A spherical body 30, a ball, is also located in the passage, which ball has a given own weight. The diameter of the ball is selected so as to be only slightly smaller than the diameter of the passage 20. This means that the ball can move in the passage but that only a very small gap 27 is formed between the ball and the passage wall. Appropriately, the ball 30 has a diameter which is a maximum of 1.0, preferably a maximum of 0.5, and expediently a maximum of 0.2 mm smaller than the passage 20, which means that the width of the gap 27 amounts to at most half said dimension. In principle, the ball 30 can be replaced by another valve body which, in planes at right angles to the center line of the passage 20, has a circular shape, for example a cylindrical shape, ellipsoidal shape, egg shape, or a shape which includes a cylindrical portion and a spherical end portion etc.

The elastic plate 18 is provided with through-holes 32 between its underside and the passages 20. Arranged between the underside of the vacuum plate and the elastic cellular rubber plate is a filter 34 in the form of a net or the like, so that the filter covers the passages. An arrangement 40 capable of producing a negative pressure is provided for the vacuum chamber 14. The arrangement 40 comprises a pump 42 and a pipe connection 44 between the pump and the vacuum plate 12. The arrangement 40 is preferably capable of producing a relatively large flow and therefore the vacuum chamber 14 is designed to be relatively large and also the diameter of the connection pipe 44 is selected to be relatively great.

According to an embodiment of the arrangement, FIG. 1, the arrangement is designed with linear guides 60 in the vertical direction and also arrangements capable of moving the vacuum plate 12 in the vertical direction, for example pneumatic or hydraulic pistons/cylinders or electric motors. Furthermore, the arrangement is designed with linear guides 62 in the horizontal direction and also arrangements capable of moving the vacuum plate in the horizontal direction. The arrangement is also provided with an arrangement so as to be capable of tilting the plate in planes which deviate from the horizontal plane. This is effected for example by a pneumatic or hydraulic cylinder 64A–D at each corner of the plate. The cylinders 64A–D can be actuated independently of one another in order to individually move a selected corner in the vertical direction.

Figure 4:
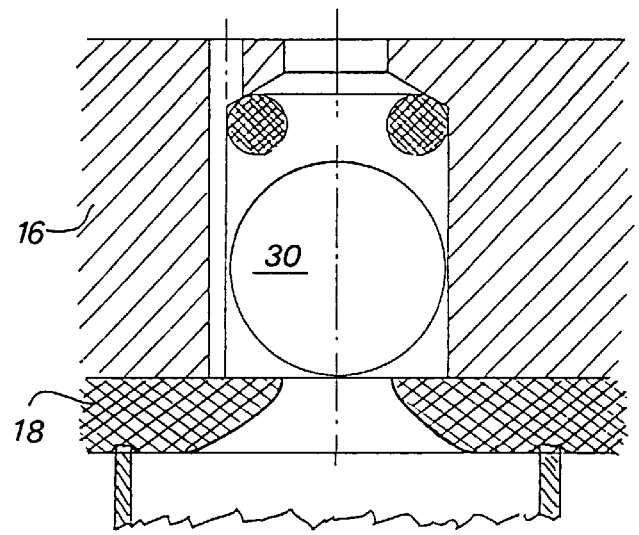
FIGS. 4 and 5 show two different detailed views of how a cellular rubber plate mounted on the vacuum plate is shaped during use at different passage diameters.

The arrangement functions as follows. Via the pipe connection 44, the vacuum pump 42 produces a negative pressure in the vacuum chamber 14 which means that the balls 30 in the passages 20 are sucked up against the O-ring 26 which bears against the shoulder 22 and thus seal the passages with the exception of a small air flow which passes through the escape air holes 24. The articles to be lifted, for example a number of containers to be lifted from a pallet 66 to a filling line, are placed in the correct position. The lifting arrangement moves the vacuum plate 12 to the correct position in the lateral direction and lowers the vacuum plate 12 until the cellular rubber plate 18 bears against the upper edge of the articles. Contact with the articles gives rise to a pressure change in the passages 20, which are covered by the articles, because of the escape air passages 24, whereupon the ball 30 drops from its seat against the O-ring, FIG. 4. The flow then increases considerably and a negative pressure is built up in both the passage 20, 32 and the article if the latter is not completely smooth and then sucks the article firmly. The passages which are not covered by an article continue to suck the ball firmly against the seat by negative pressure.

In order to ensure that all the articles to be lifted come into contact with the vacuum plate and are sucked firmly, for example if the base on which the articles stand should not be entirely plane, the tilting cylinders 64A–D are actuated, which independently raise and lower the corners of the vacuum plate. More specifically, the tilting cylinders are actuated in order in a cyclical sequence around the vacuum suction plate 12, for example in a repeated 64A-64B-64C-64D sequence one or more times, which means that the plate as it were moves in a wave pattern or "wanders" over all the articles which then come into full contact with the plate. The vacuum plate is then lifted up and moved in the lateral direction to the setting-down place 68. The articles are lowered and the negative pressure is discontinued, either by the pump being stopped or by the connection to the vacuum plate being closed. The articles are released then and the plate can collect another set of articles. Thanks to the vacuum plate being provided with the balls in the passages, on the one hand not all the passages have to be covered in order for the plate to be able to lift articles and on the other hand there is no danger if an article should come away or break so that the passage is exposed. The negative pressure in the vacuum chamber does not decrease as the changed pressure difference in the opened passage causes the ball to be sucked up against the seat and seal the passage. Thanks to the escape air passage, the negative pressure arrangement can be in operation the whole time while articles are being sucked firmly because there is constantly a given flow through the passages. If the escape air passage were not present, no pressure change would take place when the plate comes into contact with the articles, as a result of which the ball would continue to be sucked firmly against the seat. The only way to suck articles firmly would then be to have the vacuum pump shut off when the plate descends against the articles and to set it in operation after that. The passages covered by articles would then receive such a negative pressure that the articles would be sucked firmly at the same time as the passages not covered by articles would suck the balls up against the seat. Another advantage of the arrangement according to the invention is that the balls in the passages have a given own weight. The ball, or body, is manufactured from a material which gives it a given considerable own weight, for example, the body may be manufactured from steel or another metal, and the body is preferably homogenous, that is to say not hollow. When articles with a relatively great space of their own are to lifted, such as open containers and the like, the weight of the ball ensures that it is not sucked up before appropriate negative pressure has been obtained in the space of the article. The considerable own weight of the ball also ensures that it does not stick in the passage which moreover means that there can be a relatively narrow gap between the ball and the passage without risk of the ball sticking. The filter 34 provided for the passage 30 between the cellular rubber plate 18 and the lower plate 16 furthermore ensures that no refuse, dust or other particles are sucked into the arrangement. The filter 34 also serves as the lower limit of the movement of the ball 30 and means that the ball does not lie and press against the cellular rubber plate.

The O-ring in the passage affords on the one hand good sealing against the ball and on the other hand a relatively soft stop surface when the ball is sucked up against the shoulder. By virtue of the design with the O-ring covering a part of the escape air passage, the latter can be drilled with a larger drill which makes manufacture easier.

Figure 5:
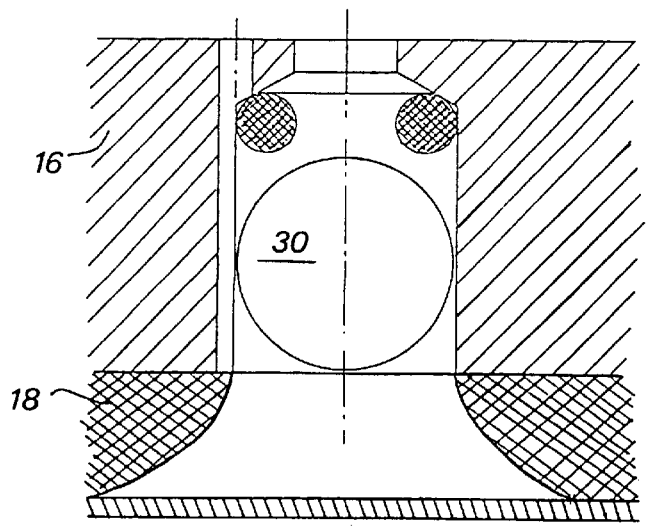

The cellular rubber plate preferably has relatively great elasticity and, by varying the size of the passages 32 through it and also its thickness, different characteristics can be obtained for different articles to be lifted. If a large number of articles are to be lifted at the same time, such as for example glass containers, aluminum containers, FIG. 4, it is an advantage if the diameters of the passages are relatively small, on the one hand because the containers themselves contain a volume in which negative pressure is built up and holds the container firmly, and on the other hand in order to avoid the passages falling outside the edge of the container in some cases. If plane articles are to be lifted, such as for example sheets or planks, the passages 32 in the cellular rubber plate can advantageously be made greater and a thicker plate can also be selected. With this design, a space is obtained, in which negative pressure can be built up. Thanks to the elasticity of the cellular rubber plate, this space becomes even greater when the article is sucked firmly as the edges of the passage in the cellular rubber are drawn inwards towards the passage, as shown in FIG. 5.

Although the invention has been described in connection with an arrangement for lifting a number of articles located on a plane suffice using a plane vacuum plate, it is to be understood that the invention can be designed in many ways for many articles to be lifted. For example, it is possible to envisage lifting wood products such as planks, laminated flooring and similar elongate articles, and then to design the vacuum plate, or plates, in the appropriate manner. Instead of an elongate plate, it is possible to envisage having a number of smaller plates and also appropriate arrangements for maneuvering the plates for positioning, lifting and moving. It is also possible to envisage lifting non-plane articles or other articles which cannot be connected to a plane surface, for example lying bottles or articles with more irregular shape. In this case, the elastic plate can be profiled in a corresponding manner, that is to say provided with recesses in its underside with a shape adapted to the shape of the article in question so that the latter, when it is orientated in the recess, can be sucked firmly therein.

By using a vacuum plate according to the invention, very effective lifting of a multitude of articles is achieved without risk of losing the lifting negative pressure if some passages should not be covered by articles. Compared with vacuum plates according to the prior art, much simpler design and manufacture are also obtained, as is cheaper construction without arduous special machining of the plate or parts thereof.

It is to be understood that the invention is not limited to the embodiment described above and shown in the figures of the drawings, but can be modified within the scope of the following patent claims.

I claim:

1. An apparatus for lifting and moving articles, comprising at least one arrangement with a cavity, said cavity comprising a vacuum chamber, connected to an arrangement which is capable of producing negative pressure in said vacuum chamber, an underside of a lower plate having an elastic airtight bottom and also having a plurality of first through-passages to said vacuum chamber, wherein each first passage is of cylindrical design with a diameter reduction in a part which is connected to the vacuum chamber, forming a shoulder in each of the first passages, in that each of the first passages contains a body arranged movably in said first passage, in that said body, in planes which are at right angles to the center line of the first passage, has a greatest diameter which is only slightly smaller than the diameter of said first passage, and in that said first passage is provided with a second passage with a considerably smaller diameter than said first passage, said body being capable of essentially blocking said first passage when a negative pressure is obtained in the vacuum chamber with the exception of a given air flow in said second passage.

2. The apparatus according to claim 1, wherein the second passage extends along the edge of the first passage over its entire length.

3. The apparatus according to claim 1, wherein said body is manufactured from a material which gives it weight.

4. The apparatus according to claim 3, wherein the body is manufactured from steel or another metal.

5. The apparatus according to claim 3, wherein the body is homogenous.

6. The apparatus according to claim 1, wherein the body consists of a spherical ball.

7. The apparatus according to claim 1, wherein the first passage is provided with an elastic ring mounted against the shoulder.

8. The apparatus according to claim 7, wherein the elastic ring partly covers the second passage.

9. The apparatus according to claim 1, wherein the first passage is provided with a filter mounted between the lower plate and the elastic bottom.

10. The apparatus according to claim 1, wherein in that the arrangement for producing a negative pressure is capable of generating a flow in the arrangement.

11. A lifting device comprising the apparatus according to claim 1, wherein it comprises a mechanism capable of moving the arrangement vertically and horizontally, with the underside of the plate parallel to the plane which is formed by the surfaces of the articles facing the arrangement, and further comprising members which, on contact of the arrangement with the articles to be lifted, are capable of angling the arrangement in relation to said plane.

12. The lifting device according to claim 11, wherein said angling of the plate is brought about in a cycle in which, in order, one of the corners of the plate is moved an additional distance towards said articles while the other corners are not acted on.

13. The lifting device according to claim 11, wherein said movement takes place with the aid of a piston/cylinder arrangement.

* * * * *

UNITED STATES PATENT AND TRADEMARK OFFICE
CERTIFICATE OF CORRECTION

PATENT NO. : 6,039,529
DATED : March 21, 2000
INVENTOR(S) : Persson

It is certified that error appears in the above-identified patent and that said Letters Patent is hereby corrected as shown below:

Title page,
Insert

-- [22] PCT Filed: May 22, 1997

[86] PCT No.: PCT/SE97/00832

§ 371 Date: Nov. 24, 1998

§ 102(e) Date: Nov. 24, 1998

[87] PCT Pub. No.: WO97/45355

PCT Pub. Date: Dec. 4, 1997 --.

Signed and Sealed this

Fifth Day of February, 2002

Attest:

JAMES E. ROGAN
Attesting Officer *Director of the United States Patent and Trademark Office*